(12) United States Patent
Liu et al.

(10) Patent No.: US 8,152,306 B2
(45) Date of Patent: *Apr. 10, 2012

(54) WAVEGUIDE DISPLAY

(75) Inventors: Jian-Qiang Liu, Campbell, CA (US);
Xiao-Dong Sun, Fremont, CA (US)

(73) Assignee: Sun Innovations, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,452

(22) Filed: Jun. 5, 2011

(65) Prior Publication Data

US 2011/0235359 A1    Sep. 29, 2011

Related U.S. Application Data

(63) Continuation of application No. 11/852,297, filed on Sep. 8, 2007, now Pat. No. 7,976,169, which is a continuation-in-part of application No. 10/843,083, filed on May 10, 2004, now abandoned, said application No. 11/852,297 is a continuation-in-part of application No. 11/107,203, filed on Apr. 15, 2005, now Pat. No. 7,452,082, said application No. 11/852,297 is a continuation-in-part of application No. 11/367,285, filed on Mar. 3, 2006, now Pat. No. 7,537,346, said application No. 11/852,297 is a continuation-in-part of application No. 11/464,362, filed on Aug. 14, 2006, now abandoned, which is a continuation of application No. 10/848,489, filed on May 18, 2004, now Pat. No. 7,090,355, said application No. 11/852,297 is a continuation-in-part of application No. 11/332,792, filed on Jan. 14, 2006, now abandoned, which is a continuation of application No. 10/979,131, filed on Nov. 3, 2004, now Pat. No. 6,986,581.

(60) Provisional application No. 60/470,530, filed on May 14, 2003, provisional application No. 60/563,376, filed on Apr. 19, 2004, provisional application No. 60/579,067, filed on Jun. 10, 2004, provisional application No. 60/586,746, filed on Jul. 10, 2004, provisional application No. 60/590,469, filed on Jul. 24, 2004, provisional application No. 60/598,527, filed on Aug. 3, 2004, provisional application No. 60/599,826, filed on Aug. 7, 2004, provisional application No. 60/626,152, filed on Nov. 8, 2004, provisional application No. 60/645,245, filed on Jan. 20, 2005, provisional application No. 60/658,242, filed on Mar. 3, 2005, provisional application No. 60/471,968, filed on May 19, 2003, provisional application No. 60/516,939, filed on Nov. 3, 2003, provisional application No. 60/845,799, filed on Sep. 18, 2006, provisional application No. 60/854,504, filed on Oct. 26, 2006.

(51) Int. Cl.
*G03B 21/14* (2006.01)
*G03B 21/56* (2006.01)

(52) U.S. Cl. ............... 353/31; 353/74; 353/79; 349/62; 359/452

(58) Field of Classification Search ......... 353/31.74–78; 385/133.901; 359/630, 631, 639, 350, 359, 359/361, 52, 443, 460, 452; 349/62, 65
See application file for complete search history.

(56) References Cited

U.S. PATENT DOCUMENTS 3,598,995 A * 8/1971 Inoue et al. ............... 250/483.1
(Continued)

*Primary Examiner* — William C Dowling
(74) *Attorney, Agent, or Firm* — Sherr & Vaughn, PLLC

(57) ABSTRACT

An apparatus (e.g. a display) including a display substrate and a waveguide. The waveguide may guide ultraviolet light from the light source onto the display substrate. The display substrate may include light emitting material configured to emit visible light in response to absorption of the ultraviolet light.

20 Claims, 13 Drawing Sheets

U.S. PATENT DOCUMENTS

| | | | | |
|---|---|---|---|---|
| 3,881,800 A * | 5/1975 | Friesem | | 359/25 |
| 3,953,117 A * | 4/1976 | Cannon | | 353/11 |
| 4,158,210 A * | 6/1979 | Watanabe et al. | | 348/796 |
| 4,689,522 A * | 8/1987 | Robertson | | 313/506 |
| 4,713,577 A * | 12/1987 | Gualtieri et al. | | 313/468 |
| 4,814,666 A * | 3/1989 | Iwasaki et al. | | 313/468 |
| 4,960,314 A * | 10/1990 | Smith et al. | | 359/15 |
| 4,989,956 A * | 2/1991 | Wu et al. | | 349/71 |
| 5,045,706 A * | 9/1991 | Tanaka et al. | | 250/483.1 |
| 5,078,462 A * | 1/1992 | Gravisse | | 359/359 |
| 5,142,387 A * | 8/1992 | Shikama et al. | | 349/9 |
| 5,162,160 A * | 11/1992 | Matsui et al. | | 428/690 |
| 5,233,197 A * | 8/1993 | Bowman et al. | | 250/461.1 |
| 5,289,315 A * | 2/1994 | Makita et al. | | 359/634 |
| 5,347,644 A * | 9/1994 | Sedlmayr | | 359/465 |
| 5,424,535 A * | 6/1995 | Albion et al. | | 250/225 |
| 5,473,396 A * | 12/1995 | Okajima et al. | | 353/122 |
| 5,566,025 A * | 10/1996 | Knoll et al. | | 359/630 |
| 5,646,479 A * | 7/1997 | Troxell | | 313/495 |
| 5,684,621 A * | 11/1997 | Downing | | 359/326 |
| 5,764,403 A * | 6/1998 | Downing | | 359/326 |
| 5,784,162 A * | 7/1998 | Cabib et al. | | 356/456 |
| 5,786,582 A * | 7/1998 | Roustaei et al. | | 235/462.07 |
| 5,914,807 A * | 6/1999 | Downing | | 359/326 |
| 5,921,650 A * | 7/1999 | Doany et al. | | 353/31 |
| 5,943,160 A * | 8/1999 | Downing | | 359/326 |
| 5,956,172 A * | 9/1999 | Downing | | 359/326 |
| 5,957,560 A * | 9/1999 | Do et al. | | 353/88 |
| 6,064,521 A * | 5/2000 | Burke | | 359/443 |
| 6,128,131 A * | 10/2000 | Tang | | 359/443 |
| 6,166,852 A * | 12/2000 | Miro | | 359/361 |
| 6,204,971 B1 * | 3/2001 | Morris et al. | | 359/619 |
| 6,221,112 B1 * | 4/2001 | Snider | | 8/470 |
| 6,239,907 B1 * | 5/2001 | Allen et al. | | 359/443 |
| 6,261,402 B1 * | 7/2001 | Watanabe et al. | | 156/230 |
| 6,327,074 B1 * | 12/2001 | Bass et al. | | 359/326 |
| 6,337,769 B1 * | 1/2002 | Lee | | 359/454 |
| 6,381,068 B1 * | 4/2002 | Harada et al. | | 359/443 |
| 6,439,888 B1 * | 8/2002 | Boutoussov et al. | | 433/215 |
| 6,466,184 B1 * | 10/2002 | Whitesell et al. | | 345/6 |
| 6,501,590 B2 * | 12/2002 | Bass et al. | | 359/326 |
| 6,507,436 B2 * | 1/2003 | Nishikawa et al. | | 359/485.02 |
| 6,654,161 B2 * | 11/2003 | Bass et al. | | 359/326 |
| 6,769,773 B1 * | 8/2004 | Wu | | 353/33 |
| 6,804,053 B2 * | 10/2004 | Etori et al. | | 359/453 |
| 6,809,781 B2 * | 10/2004 | Setlur et al. | | 349/70 |
| 6,844,950 B2 * | 1/2005 | Ja Chisholm et al. | | 359/107 |
| 6,870,671 B2 * | 3/2005 | Travis | | 359/443 |
| 6,897,999 B1 * | 5/2005 | Bass et al. | | 359/326 |
| 6,986,581 B2 * | 1/2006 | Sun et al. | | 353/31 |
| 7,040,764 B2 * | 5/2006 | Przybyla et al. | | 353/84 |
| 7,213,923 B2 * | 5/2007 | Liu et al. | | 353/31 |
| 7,869,117 B2 * | 1/2011 | Choi et al. | | 359/296 |
| 7,942,850 B2 * | 5/2011 | Levit et al. | | 604/103.07 |
| 7,976,169 B2 * | 7/2011 | Liu et al. | | 353/31 |
| 2001/0005282 A1 * | 6/2001 | Etori et al. | | 359/453 |
| 2002/0024495 A1 * | 2/2002 | Lippert et al. | | 345/98 |
| 2002/0048058 A1 * | 4/2002 | Nishikawa et al. | | 359/15 |
| 2002/0080482 A1 * | 6/2002 | Watanabe et al. | | 359/452 |
| 2002/0088925 A1 * | 7/2002 | Nestorovic et al. | | 250/214 VT |
| 2002/0120916 A1 * | 8/2002 | Snider, Jr. | | 717/100 |
| 2002/0140338 A1 * | 10/2002 | Sluzky | | 313/461 |
| 2002/0190224 A1 * | 12/2002 | Tazaki | | 250/484.4 |
| 2003/0002153 A1 * | 1/2003 | Hiraishi et al. | | 359/452 |
| 2003/0198456 A1 * | 10/2003 | Steiner et al. | | 385/146 |
| 2003/0213967 A1 * | 11/2003 | Forrest et al. | | 257/96 |
| 2003/0214724 A1 * | 11/2003 | Fujikawa et al. | | 359/630 |
| 2003/0227004 A1 * | 12/2003 | Dopps | | 252/301.36 |
| 2004/0022071 A1 * | 2/2004 | Cheng et al. | | 362/557 |
| 2004/0041988 A1 * | 3/2004 | Kitamura | | 353/99 |
| 2004/0070551 A1 * | 4/2004 | Walck et al. | | 345/7 |
| 2004/0070824 A1 * | 4/2004 | Toda et al. | | 359/452 |
| 2004/0090794 A1 * | 5/2004 | Ollett et al. | | 362/555 |
| 2004/0100692 A1 * | 5/2004 | Hou | | 359/452 |
| 2004/0114219 A1 * | 6/2004 | Richardson | | 359/368 |
| 2004/0135976 A1 * | 7/2004 | Ishihara et al. | | 353/99 |
| 2004/0149998 A1 * | 8/2004 | Henson et al. | | 257/98 |
| 2004/0164669 A1 * | 8/2004 | Kawaguchi et al. | | 313/501 |
| 2004/0224154 A1 * | 11/2004 | Toda et al. | | 428/402 |
| 2004/0233526 A1 * | 11/2004 | Kaminsky et al. | | 359/452 |
| 2004/0257650 A1 * | 12/2004 | Parusel et al. | | 359/453 |
| 2005/0030617 A1 * | 2/2005 | Umeya | | 359/443 |
| 2005/0063054 A1 * | 3/2005 | Umeya | | 359/443 |
| 2005/0088736 A1 * | 4/2005 | Ghozeil et al. | | 359/443 |
| 2005/0088737 A1 * | 4/2005 | Piehl | | 359/443 |
| 2005/0152032 A1 * | 7/2005 | Olofson et al. | | 359/453 |
| 2005/0174635 A1 * | 8/2005 | Bruegl et al. | | 359/443 |

* cited by examiner

WAVEGUIDE DISPLAY

The present application is a continuation of U.S. patent application Ser. No. 11/852,297 (filed Sep. 8, 2007) now U.S. Pat. No. 7,976,169, which is a continuation-in-part of U.S. patent application Ser. No. 10/843,083 (filed May 10, 2004) now abandoned, which claims priority to U.S. Provisional Patent Application No. 60/470,530 (filed May 14, 2003), both of which are hereby incorporated by reference in their entirety, which is a continuation-in-part of U.S. patent application Ser. No. 11/107,203 (filed Apr. 15, 2005 and issued as U.S. Pat. No. 7,452,082), which claims priority to U.S. Provisional Patent Application Nos. 60/563,376 (filed Apr. 19, 2004), 60/579,067 (filed Jun. 10, 2004), 60/586,746 (filed Jul. 10, 2004), 60/590,469 (filed Jul. 24, 2004), 60/598,527 (filed Aug. 3, 2004), 60/599,826 (filed Aug. 7, 2004), 60/626,152 (filed Nov. 8, 2004), 60/645,245 (filed Jan. 20, 2005), and 60/658,242 (filed Mar. 3, 2005), all of which are hereby incorporated by reference in their entirety, which is a continuation-in-part of U.S. patent application Ser. No. 11/367,285 (filed Mar. 3, 2006) now U.S. Pat. No. 7,537,346, which claims priority to U.S. Provisional Patent Application No. 60/658,242 (filed Mar. 3, 2005), both of which are hereby incorporated by reference in their entirety, which is a continuation-in-part of U.S. patent application Ser. No. 11/464,362 (filed Aug. 14, 2006) now abandoned, which is a continuation of U.S. patent application Ser. No. 10/848,489 (filed May 18, 2004 and issued as U.S. Pat. No. 7,090,355), which claims priority to U.S. Provisional Patent Application No. 60/471,968 (filed on May 19, 2003), all of which are hereby incorporated by reference in their entirety, which is a continuation-in-part of U.S. patent application Ser. No. 11/332,792 (filed Jan. 14, 2006) now abandoned, which is a continuation of U.S. patent application Ser. No. 10/979,131 (filed on Nov. 3, 2004 and issued as U.S. Pat. No. 6,986,581), which claims priority to U.S. Provisional Patent Application No. 60/516,939 (filed on Nov. 3, 2003), all of which are hereby incorporated by reference in their entirety, and which claims priority to U.S. Provisional Patent Application Nos. 60/845,799 (filed Sep. 18, 2006) and 60/854,504 (filed Oct. 26, 2006).

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays with relatively high contrast images. However, there have been many technical challenges that have prevented optimization of image contrast. Specifically, it has been difficult to minimize the amount of white light emitted from a display, which may detract from the contrast of the image displayed. It may also be desirable for display to be relatively thin for both aesthetic appearances and practical implementation. For example, thin display (e.g. plasma display and LCD display) may be mounted on walls or placed on a table with a relatively small width.

SUMMARY

In accordance with embodiments, an apparatus (e.g. a display) may include a display substrate and a waveguide. The waveguide may guide ultraviolet light from the light source onto the display substrate. The display substrate may include light emitting material configured to emit visible light in response to absorption of the ultraviolet light.

In embodiments, since ultraviolet light is converted to visible light by absorption at light emitting material, relatively high-contrast images may be displayed. Further, a waveguide may allow for the thickness of a display to be relatively small, maximizing the aesthetic appearance of the display and/or maximizing practical implementation, in accordance with embodiments.

In embodiments, the display substrate is a substantially dark substrate that is substantially transparent to ultraviolet light. Light emitting material may be configured to emit visible light in response to absorption of ultraviolet light. Light emitting material may include a plurality of light emitting particles, with each of the plurality of light emitting particles having a diameter less than about 500 nanometers.

DRAWINGS

DESCRIPTION

Figure 1:
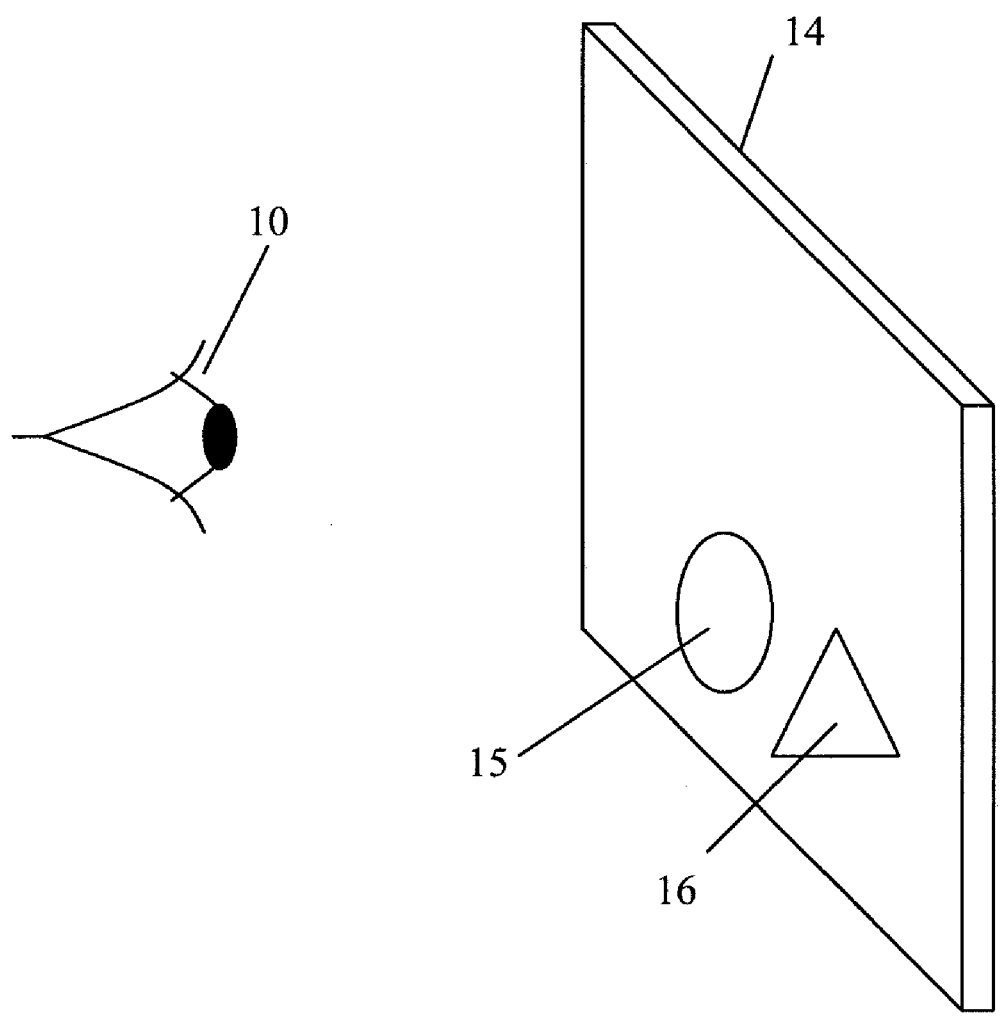
FIG. 1 is an example diagram of a display with images being emitted from a substantially dark substrate, in accordance with embodiments.

FIG. 1 is an example diagram of a display, in accordance with embodiments. Substrate 14 may be a substantially dark substrate. Viewer 10 sees images (e.g. circle 15 and triangle 16) that are created at substrate 14. Substrate 14 may be part of a front projection or rear projection display.

Figure 2:
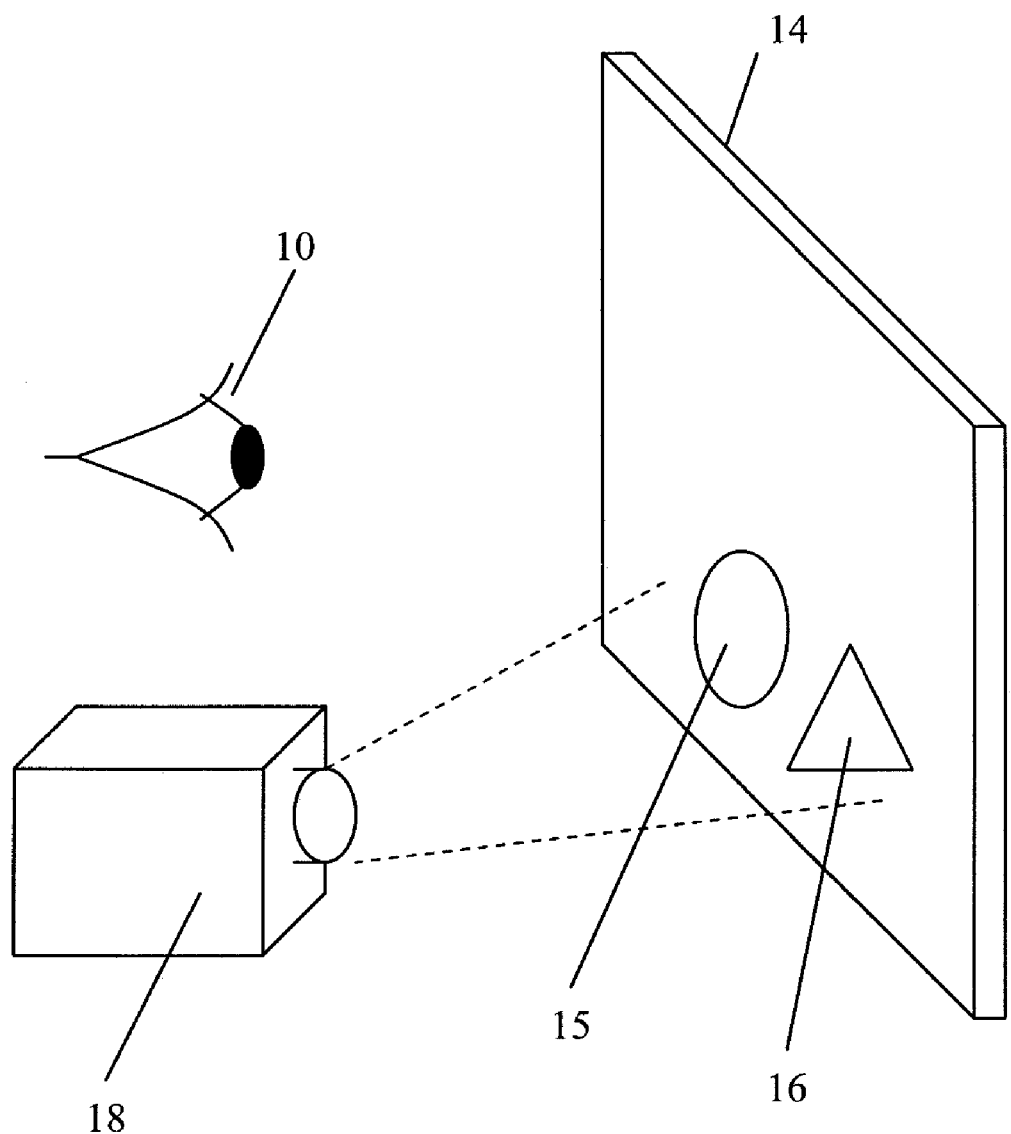
FIG. 2 is an example diagram of a front projection display illuminated with excitation light from a light source, in accordance with embodiments.
Figure 3:
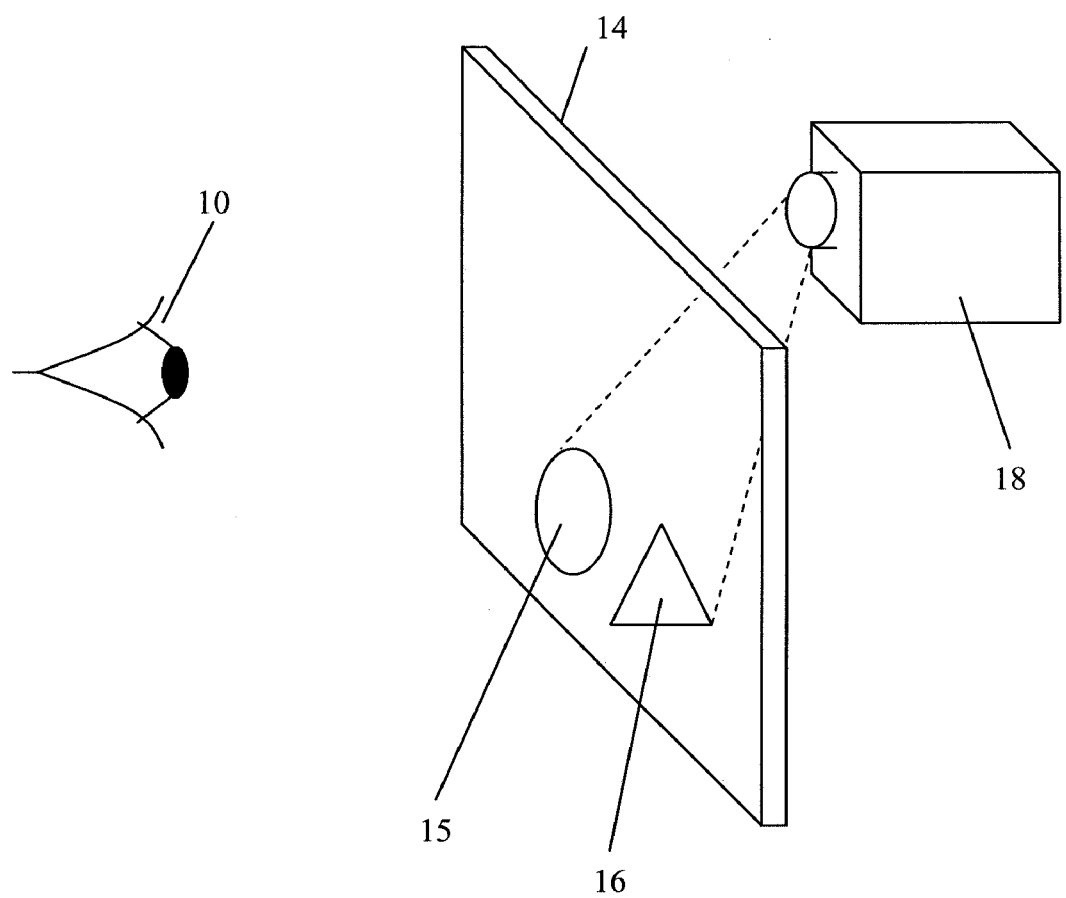
FIG. 3 is an example diagram of a rear projection display illuminated with excitation light from a light source, in accordance with embodiments.

FIGS. 2 and 3 are example diagrams of transparent displays illuminated with excitation light (e.g. ultraviolet light or infrared light) from a light source 18 (e.g. projector, LED array, laser, or other light source that emits ultraviolet or infrared light), in accordance with embodiments. Substrate 14 may receive excitation light from a light source 18. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

The excitation light may be ultraviolet light, in accordance with embodiments of the present invention. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light. In embodiments, the light emitting material is fluorescent material.

The excitation light may be infrared light, in accordance with embodiments of the present invention. If the excitation light is infrared light, then when the light emitting material emits visible light in response to the infrared light, an up-conversion physical phenomenon occurs. Specifically, infrared light has a longer wavelength and lower energy than visible light. Accordingly, when the light emitting material absorbs the infrared light and emits higher energy visible light, the infrared light is up-converted to visible light because the infrared light's energy level goes up when it is converted into visible light. In embodiments, the light emitting material is fluorescent material. In the up-conversion physical phenomenon, absorption of more than one infrared light photon may be necessary for the emission of every visible light photon.

In embodiments illustrated in FIG. 2, excitation light is output by light source 18, with the light source projecting light from the viewer side of the substrate 14. Accordingly, the substantially dark substrate 14 may be implemented in a front projection display. In embodiments illustrated in FIG. 3, excitation light is output be light source 18, with the light source projecting light from the opposite side of substrate 14 than the viewer 10. One of ordinary skill in the art will appreciate that projection could include any transmission of light into the substrate 14, whether the light source 18 is independent of substrate 14 or integrated into substrate 14.

Light source 18 may be a digital projector. In embodiments, light source 18 is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the light source 18 is a liquid crystal display (LCD) projector. In embodiments, the light source 18 may be a liquid crystal on silicon (LCOS) projector. In embodiments, the light source 18 may be an analog projector (e.g. a slide film projector or a movie film projector). In embodiments, light source 18 may be a laser. In down-conversion embodiments, the output from light source 18 may be ultraviolet light. In up-conversion embodiments, the output from light source 18 may be infrared light. One of ordinary skill in the art would appreciate other types of projectors, lasers or other light radiating devices which may be used to project ultraviolet light on substrate 14.

Figure 4:
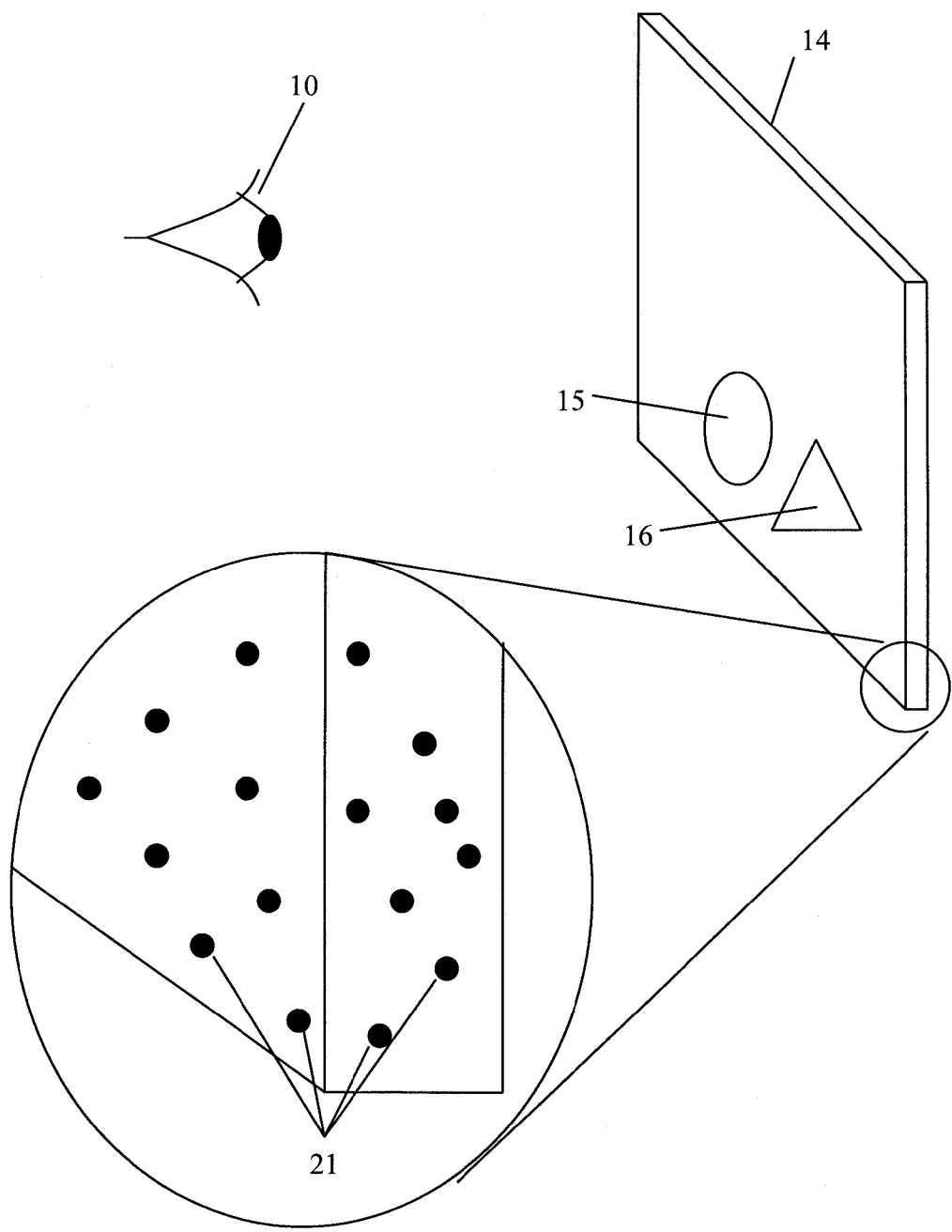
FIG. 4 is an example diagram of light emitting particles dispersed in a substantially transparent substrate, in accordance with embodiments.
Figure 5:
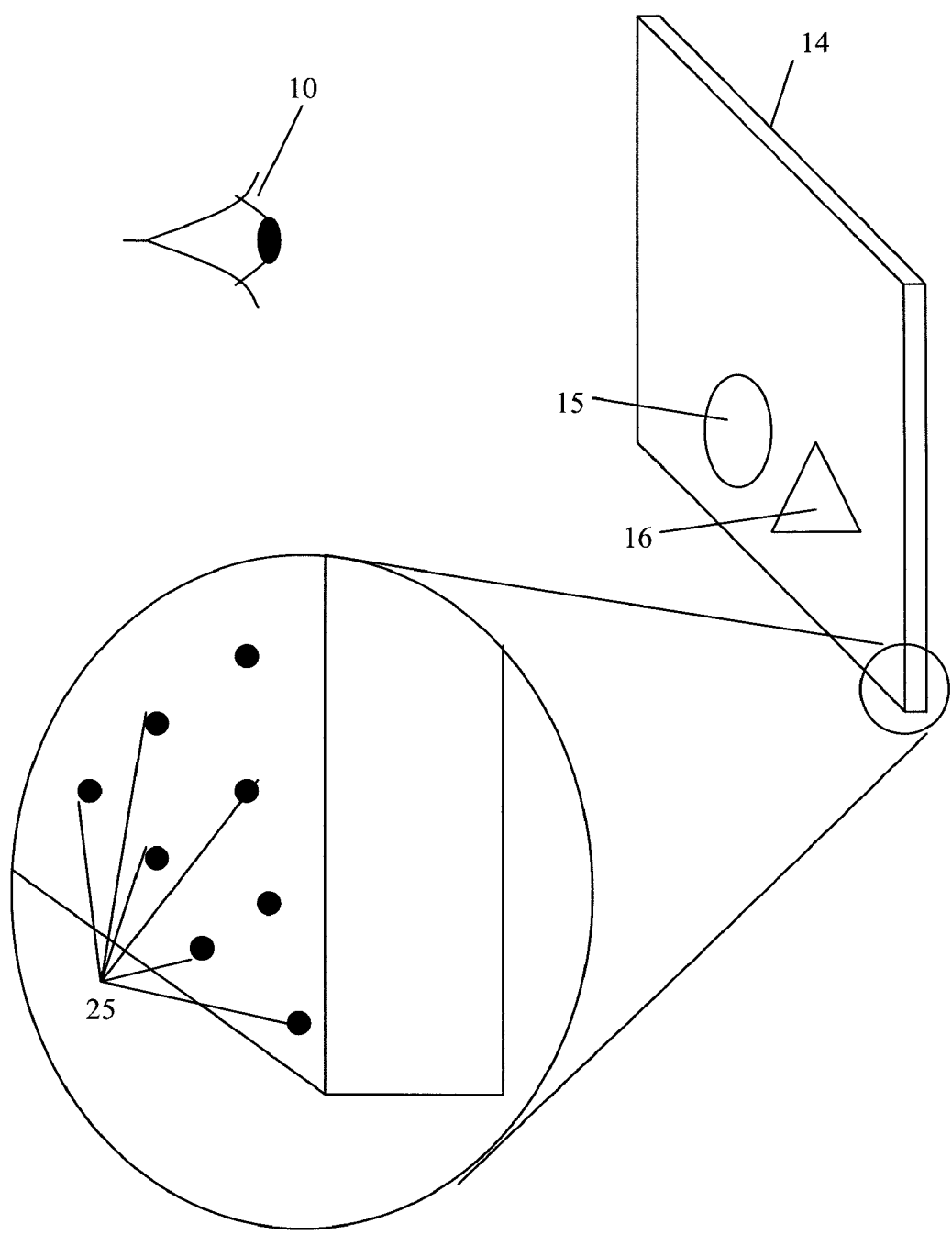
FIG. 5 is an example diagram of light emitting particles disposed on a surface of a substantially transparent substrate, in accordance with embodiments.

FIG. 4 is an example diagram of light emitting material (e.g. light emitting particles 21) dispersed in a substantially dark substrate, according to embodiments. When excitation light is absorbed by the light emitting particles 21, the light emitting particles emit visible light. Accordingly, in down-conversion embodiments, when ultraviolet light is absorbed by light emitting particles 21, visible light is emitted from the light emitting particles. Likewise, in up-conversion embodiments, when infrared light is absorbed by light emitting particles 21, visible light is emitted from the light emitting particles. FIG. 5 is an example diagram of light emitting particles 25 disposed on a surface of substrate 14. Light emitting particles 25 may be integrated into substrate 14 by being coated on substrate 14. In embodiments substrate 14 is a substantially homogeneous substrate with light emitting particles (e.g. particles 21 or particles 25) integrated into the substrate 14. Although substrate 14 may be substantially homogeneous, one of ordinary skill in the art will appreciate that the concentration of light emitting particles integrated into substrate 14 may be varying (e.g. concentration of particles on or near the surface of substrate 14).

Light emitting material (e.g. light emitting particles 21 and light emitting particles 25) may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 500 nanometers. According to embodiments, each of the light emitting particles has a diameter that is less than about 400 nanometer. According to embodiments, each of the light emitting particles has a diameter that is less than about 300 nanometer. According to embodiments, each of the light emitting particles has a diameter that is less than about 200 nanometers. According to embodiments, each of the light emitting particles has a diameter that is less than about 100 nanometers. The light emitting particles may be individual molecules.

Different types of light emitting particles (e.g. light emitting particles 21 and light emitting particles 25) may be used together that have different physical characteristics. For example, in order to emit color images in substrate 14, different types of light emitting particles may be utilized that are associated with different colors. For example, a first type of light emitting particles may be associated with the color red, a second type of light emitting particles may be associated with the color green, and a third type of light emitting particles may be associated with the color blue. Although the example first type, second type, and third type of light emitting particles are primary colors, one of ordinary skill in the art would appreciate other combinations of colors (e.g. types of colors and number of colors) in order to facilitate a color display.

In down-conversion embodiments, light emitting particles which emit red light may include Europium, light emitting particles which emit green light may include Terbium, and light emitting particles which emit blue or yellow light may include Cerium (and/or Thulium). In up-conversion embodiments, light emitting particles which emit red light may include Praseodymium, light emitting particles which emit green light may include Erbium, and light emitting particles which emit blue light may include Thulium. In embodiments, light emitting particles are fluorescent molecules that emit different colors (e.g. red, green, and blue). In embodiments, light emitting particles are included in pure organic or organo-metallic dyes.

Different types of light emitting particles may absorb different ranges of excitation light to emit the different colors. Accordingly, the wavelength range of the excitation light may be modulated in order to control the visible color emitted from the light emitting particles in substrate 14. In embodiments, different types of light emitting particles may be mixed together and integrated into substrate 14. By modulating the wavelength of the excitation light, along with spatial modulation and intensity modulation of the excitation light, visible light with specific color characteristics can be created in substrate 14. For example, by selectively exciting specific combinations of different types of light emitting particles associated with primary colors, virtually any visible color can be emitted from substrate 14.

In embodiments, median particle size of fluorescent materials may not be limited to particles having a diameter less than approximately 500 nm. For example, in embodiments, a substantially transparent fluorescent display screen may include fluorescent materials that have similar optical properties as the host (e.g. a host substantially transparent substrate. In embodiments, fluorescent materials may have a refractive index than is substantially the same or relatively close to the refractive index of the host. In embodiments, where fluorescent materials are refractive index match to the host, the particle size of the fluorescent materials could be larger than 500 nm. However, the particle sizes may also be less than 500 nm, in accordance with embodiments. In embodiments, a transparent screen with refractive indexed matched fluorescent materials may be implemented with a variety of backgrounds (e.g. a substantially dark substrate), without significantly altering the substrate appearance. In embodiments, refractive index matched fluorescent materials may be implemented with a dark filter that transmit UV light (e.g. in a rear-projection display).

In DLP projector embodiments, the wavelength of ultraviolet light emitted from a DLP projector can be modulated using a color wheel with specific ultraviolet pass filters. Similar modulation techniques may be utilized in other projector embodiments and laser embodiments. In embodiments, multiple projectors and multiple lasers may be utilized, each being associated with a specific ultraviolet wavelength range to excite a specific type of light emitting particle, to output a specific color of light.

Figure 6:
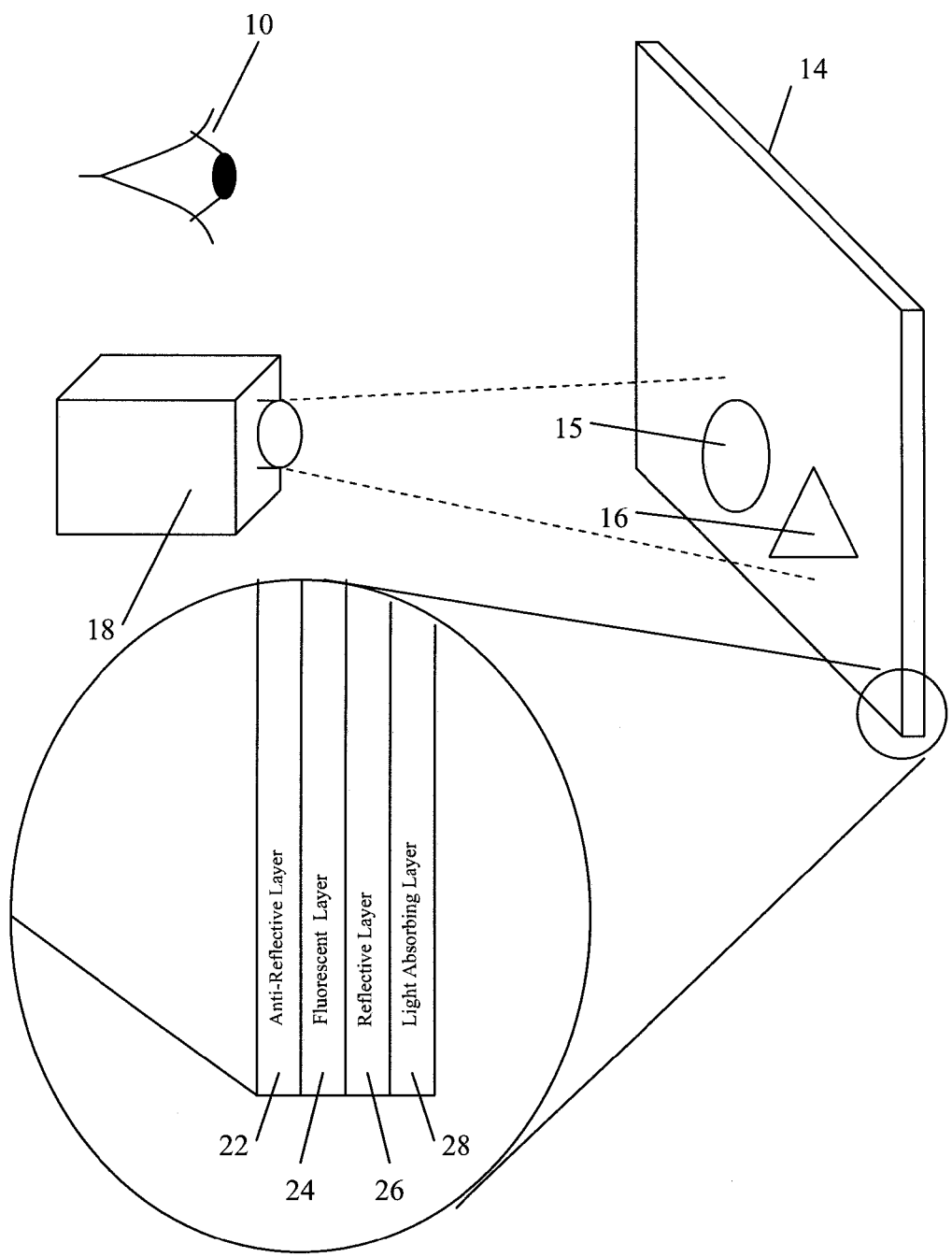
FIG. 6 is an example diagram of a display with an anti-reflective layer, a fluorescent layer, a reflective layer, and a light absorbing layer, in accordance with embodiments.

FIG. 6 is an example diagram of a display with anti-reflective layer 22, fluorescent layer 24, reflective layer 26, and light absorbing layer 28, in accordance with embodiments. The substantially dark substrate 14 depicted in FIG. 6 may be used in a front projection display. Light absorbing layer 28 may allow for high contrast images by minimizing white light emission. Reflective layer 26 may compensate for different visible color emissions based on different material properties. Fluorescent layer 24 may provide for visible light emission in response to absorption of ultraviolet light. Anti-reflective layer 22 may reduce glare on a display and provide for higher efficiency of visible light emission. In embodiments, the substantially dark substrate 14 illustrated in FIG. 6 may be utilized in a front projection display. However, one of ordinary skill in the art would appreciate that the substantially dark substrate 14 illustrated in FIG. 6 may also be utilized in a rear projection display.

In embodiments, the substantially dark substrate 14 may include anti-reflective layer 22. Anti-reflective layer 22 may be a broadband (e.g. visible and ultraviolet light) anti-reflective layer, a visible light reflective layer, or an ultra-violet light anti-reflective layer. In front projection display embodiments, anti-reflective layer 22 (e.g. broadband anti-reflective layer or visible light anti-reflective layer) may be used to reduce glare on a display seen by viewer 10. Reduced glare will allow for images to be displayed more clearly on substantially dark substrate 14. In front projection display embodiments, anti-reflective layer 22 (e.g. broadband anti-reflective layer or ultraviolet light anti-reflective layer) may be used to maximize the absorption of ultraviolet light by the light emitting materials (e.g. in fluorescent layer 24). In other words, anti-reflective layer 22 will reduce the amount of ultraviolet light that is reflected off of substantially dark substrate 14, which increases the amount of ultraviolet light that is transmitted into fluorescent layer 24 (which includes light emitting material).

In embodiments, fluorescent layer 24 includes light emitting material. The light emitting material may emit visible light in response to absorption of excitation light (e.g. ultraviolet light).

In embodiments, reflective layer 26 may reflect light. In embodiments, reflective layer 26 is a selective waveband reflective layer. A selective waveband reflective layer may compensate for varying emission efficiencies of different light emitting materials. For example, if light emitting materials that emit red light emit light at a higher intensity than light emitting materials that emit blue light, a selective waveband reflective layer may compensate for these differences in emission efficiencies. For example, reflective layer 26 may reflect blue light with a higher intensity than reflective layer 26 reflects red light. Likewise, reflective layer 26 may reflect the wavelengths of ultraviolet light that cause emission of blue light with a higher intensity than reflective layer 26 reflects red light.

In embodiments, light absorbing layer 28 may absorb light to maximize the contrast of an image (e.g. circle 15 and triangle 16) seen by a viewer 10. By absorbing visible light, less white light is emitted from the substantially dark substrate, thus maximizing contrast. In embodiments, light absorbing layer 28 may be transparent to ultraviolet light, but substantially absorbs visible light. In embodiments, light absorbing layer 28 absorbs both visible light and ultraviolet light.

Figure 7:
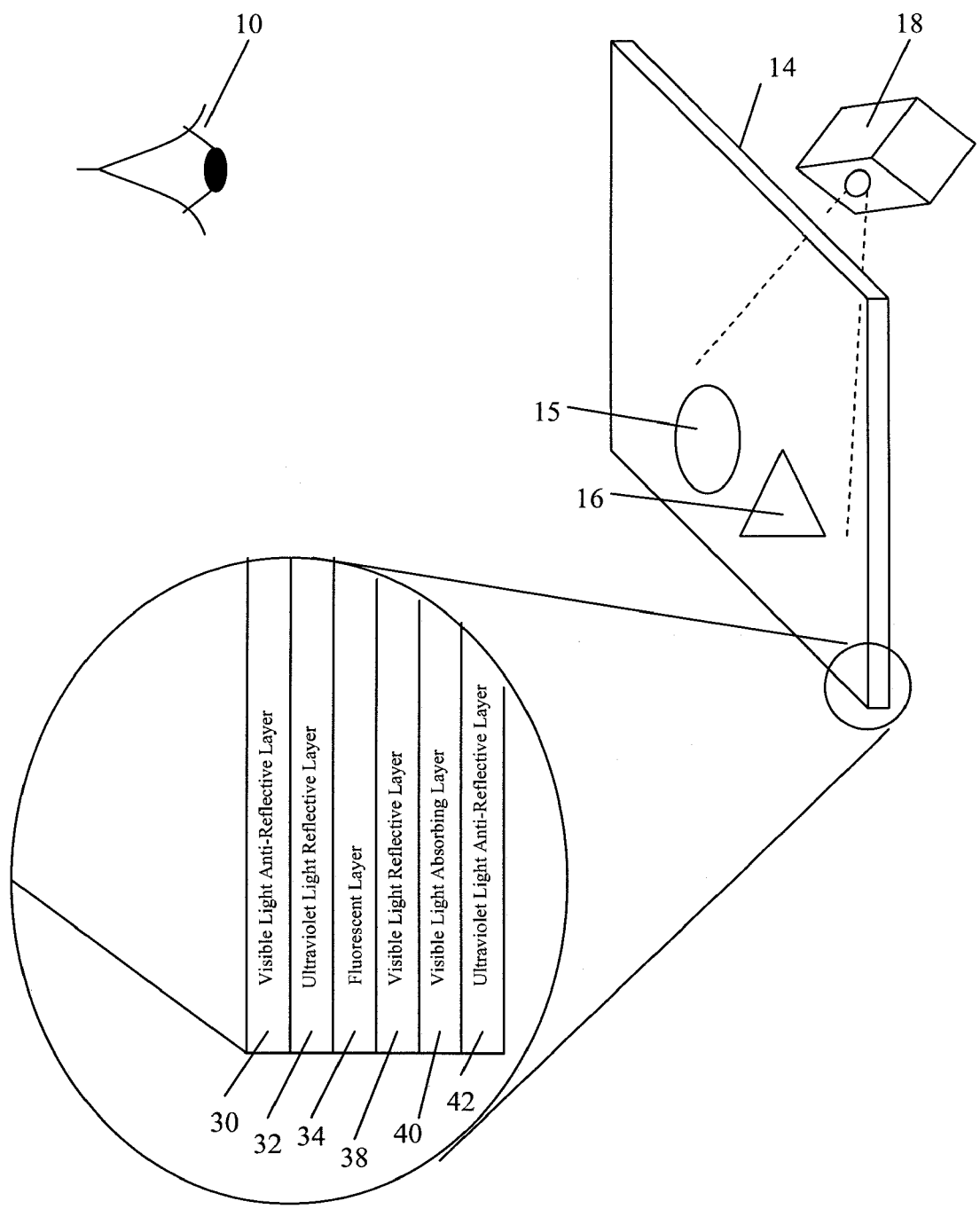
FIG. 7 is an example diagram of a display with a visible light anti-reflective layer, fluorescent layer, visible light reflective layer, visible light absorbing layer, and an ultraviolet light anti-reflective layer, in accordance with embodiments.

FIG. 7 is an example diagram of a display with visible light anti-reflective layer 30, ultraviolet light reflective layer 32, fluorescent layer 34, visible light reflective layer 38, visible light absorbing layer 40, and ultraviolet light anti-reflective layer 42. Visible light anti-reflective layer 30 may allow for higher contrast images viewed by view 10, by reducing glare of external visible light. Ultraviolet anti-reflective layer 32 may increase the efficiency of visible light emitted from fluorescent layer 34. Ultraviolet anti-reflective layer 32 may compensate for different emission characteristics of different light emitting materials in fluorescent layer 34, as a selective ultraviolet light reflector. Visible light reflector layer 38 may compensate for different emission characters of different light emitting materials in fluorescent layer 34, as a selective visible light reflector. Light absorbing layer 40 may allow for high contrast images by minimizing white light emission. Anti-reflective layer 22 may provide for higher efficiency of visible light emission. In embodiments, the substantially dark substrate 14 illustrated in FIG. 7 may be utilized in a rear projection display. However, one of ordinary skill in the art would appreciate that the substantially dark substrate 14 illustrated in FIG. 7 may also be utilized in a front projection display.

One of ordinary skill in the art would appreciate that the layers illustrated in FIGS. 6 and 7 may be used in different combination, including non-inclusion of layers, without departing from the spirit of embodiments. Further, it would be appreciated by one of ordinary skill in the art that any of the layers may further include additional layers. Other layers and/or substrates may be used in conjunction with the illustrated layers without departing from the scope of embodiments.

Example FIGS. 8 through 13 illustrate example displays including a waveguide and light emitting material, in accordance with embodiments. In embodiments, a waveguide may be implemented to guide light (e.g. ultraviolet light) from a light source to a display substrate. The display substrate may include light emitting material that emits visible light in response to absorption of excitation light (e.g. ultraviolet light). In embodiments, a waveguide may minimize the distance between a light source and a display substrate. For example, a 20 inch display may use a waveguide that is less than 1 inch thick, in accordance with embodiments. However, one of ordinary skill in the art would appreciate other dimensions of display and waveguide, in accordance with embodiments.

Figure 8:
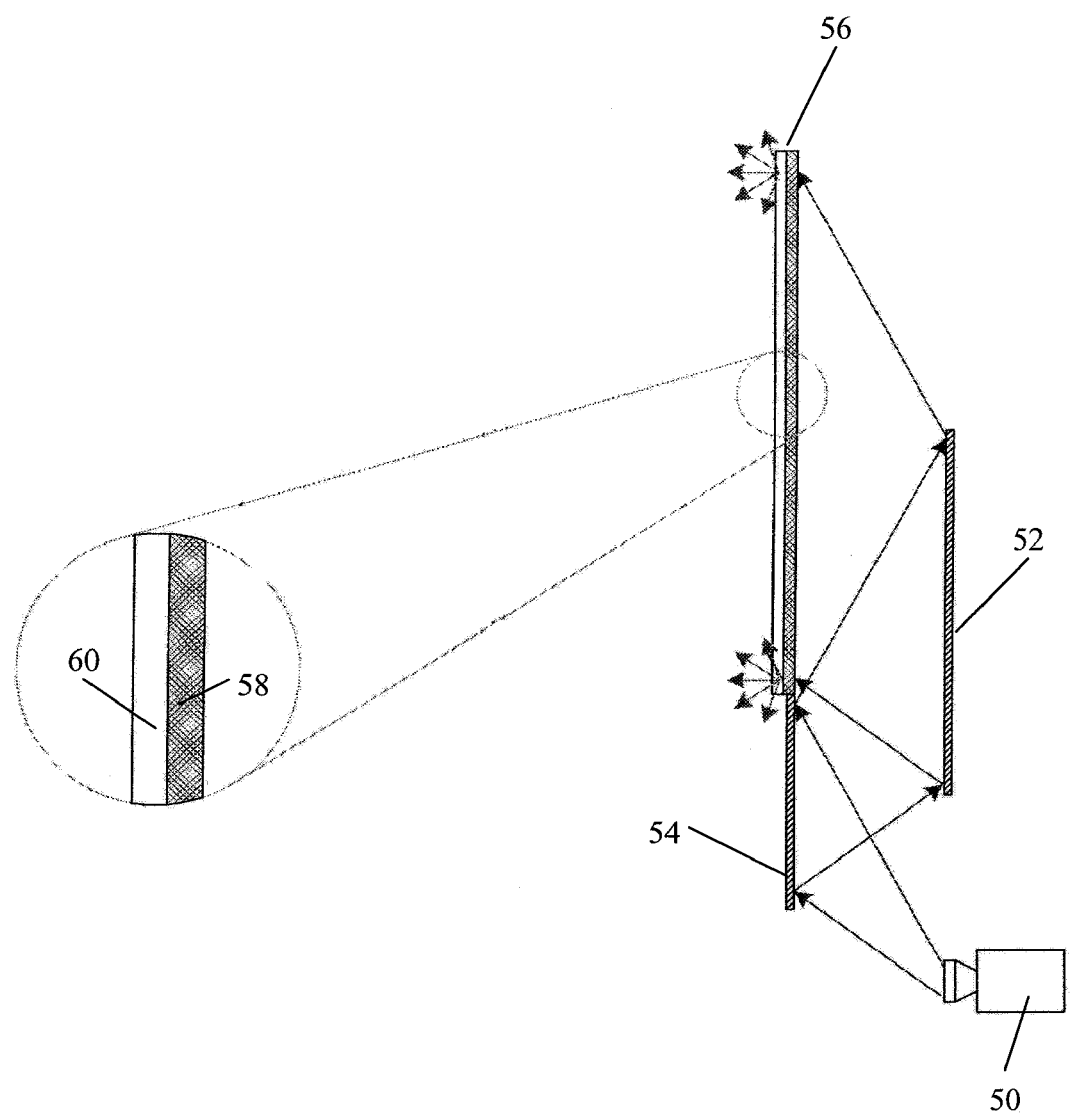
FIGS. 8 and 9 are example diagrams of displays having waveguides including two reflectors, in accordance with embodiments.

Example FIG. 8 illustrates a display with a waveguide including first reflector 54 and second reflector 52, in accordance with embodiments. Excitation light from light source 50 may be projected onto first reflector 52. The excitation light may be reflected off of first reflector 52 and directed onto second reflector 54. The excitation light projected onto second reflector 54 may be reflected off of reflector 54 and onto display substrate 56. Excitation light from light source 50 may be modulated by a modulator between light source 50 and reflector 54 or by a modulator internal to light source 50, in accordance with embodiments. A modulator may modulate the excitation light based on video and/or picture content to be displayed on display substrate 56.

In accordance with embodiments, display substrate 56 may include light emitting material that emits visible light in response to absorption of excitation light (e.g. ultraviolet light). As illustrated in example FIG. 8, display substrate 56 may include a substantially transparent fluorescent screen 60 and/or a ultraviolet transparent substantially dark substrate 58. Excitation light (e.g. ultraviolet light) reflected off of reflector 52 may pass through substantially dark substrate 58 and into substantially transparent fluorescent screen 60. Light emitting material integrated into transparent fluorescent screen 60 may absorb the excitation light and emit corresponding visible light to display an image, in accordance with embodiments. Substantially dark substrate 48 may absorb visible light directed back into the display, which may maximize the contrast of the image displayed on display substrate 56.

In embodiments, internal and/or external surfaces of display substrate 56 may be coated with at least one anti-reflective layer (e.g. film, coating, and/or surface treatment), which may maximize optical efficiency and/or image uniformity. In embodiments, internal and/or external surfaces of display substrate 56 may be treated (e.g. film, coating, or surface treatment) to minimize glare and/or maximize image contrast. Substantially dark substrate 58 and transparent fluorescent screen 60 are shown for illustrative purposes, but other implementations of display substrate 56 may be implemented, in accordance with embodiments.

In embodiments, first reflector 54 and second reflector 52 are folding mirrors. Folding mirrors may be relatively highly reflective mirror with relatively high reflection efficiency. In accordance with embodiments, a waveguide may include two reflectors. In embodiments, a waveguide may include more than two reflectors. As illustrated in example FIG. 8, first reflector 54 and second reflector 52 may be arranged substantially parallel to each other, in accordance with embodiments. In embodiments, first reflector 54 and second reflector 52 may be arranged at an angle with each other. Accordingly, projected excitation light may go through multiple reflections before being absorbed by light emitting material.

In embodiments, light source 50 may include a micro-mirror device. An example of a micro-mirror device is a Digital Light Processing (DLP) device. In embodiments, light source 50 may be a laser device including a modulator. An example of a laser device is a laser device that includes a raster display engine (e.g. a 2-axis single mirror scanner or a dual-mirror scanner). Embodiments include all light sources and/or modulators that project excitation light.

Figure 9:
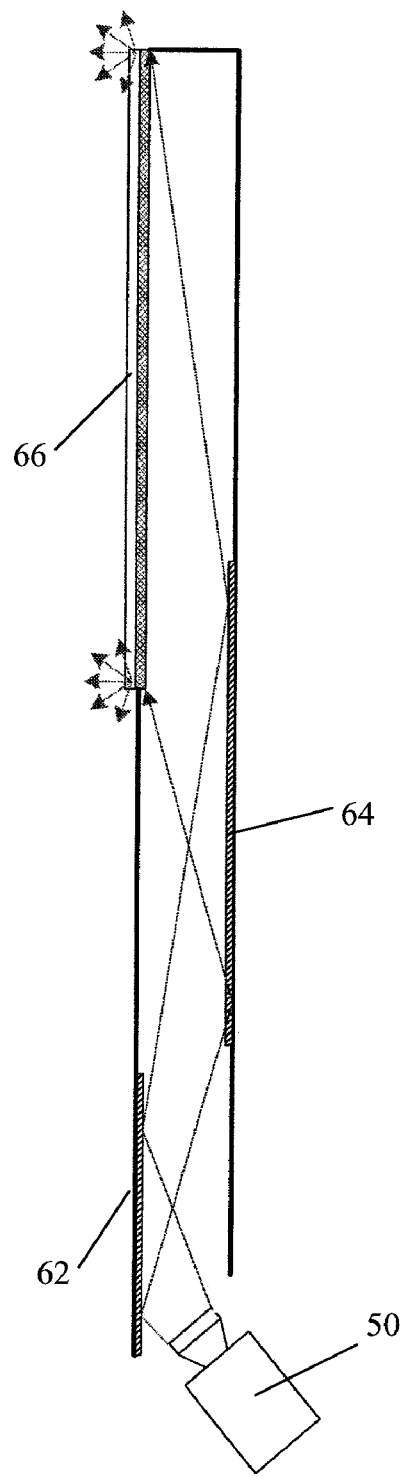

Example FIG. 9 illustrates a display with a waveguide that is relatively thin, in accordance with embodiments. As illustrated in example FIG. 9, a display includes a light source 50, first reflector 62, second reflector 64, and display substrate 66, in accordance with embodiments. Compared with embodiments illustrated in example FIG. 8, first reflector 62 and second reflector 65 may be arranged relatively close to each other, in accordance with embodiments. Accordingly, the closer that first reflector 62 and second reflector 65 are together, the thinner a display may be. In embodiments illustrated in example FIG. 9, light projected by light source 50 may have a relatively high incident angle, which may improve optical efficiency at the reflectors. In embodiments, first reflector and second reflector may be arranged at an angle. One of ordinary skill in the art will appreciate other arrangements of first reflector and second reflector 65, without departing from the spirit and scope of embodiments.

Figure 10:
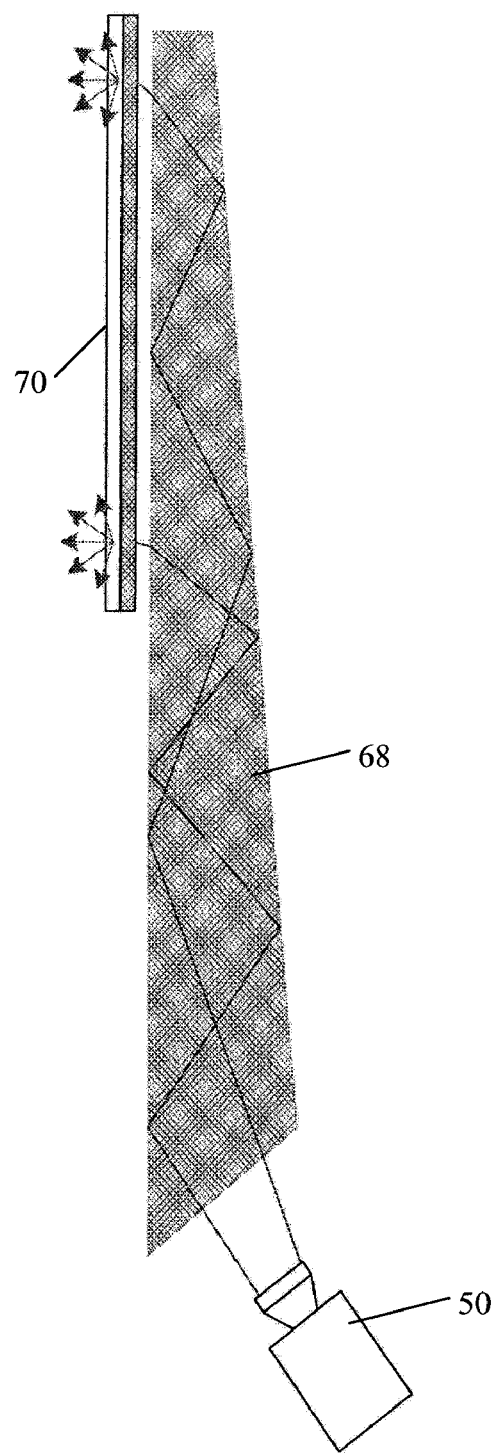
FIG. 10 is an example diagram of a display having a waveguide substrate, in accordance with embodiments.

Example FIG. 10 illustrates a display having a waveguide substrate, in accordance with embodiments. A display may include waveguide 68. Excitation light from light source 50 may be projected into waveguide 68. Excitation light projected into waveguide 68 may be internally reflected to be projected onto display substrate 70. Internal reflection inside waveguide 68 may include multiple internal reflections (e.g. the four internal reflections illustrated in example FIG. 10). Any number of internal reflection configurations may be implemented, in accordance with embodiments.

In embodiments, waveguide 68 may have a wedge shape. A wedge shape may allow excitation light to be selectively internally reflected or transmitted out of waveguide 68 and into display substrate 70. In other words, there may be increasingly higher incident angles of the excitation light, such that the internal reflections will allow light to be reflected and will allow the light to be finally transmitted into display substrate 70, in accordance with embodiments. In embodiments, waveguide 68 may include solid glass, plastic slab, or other similar material. The material of waveguide 68 may be substantially transparent to the excitation light (e.g. substantially transparent to ultraviolet light) from light source 50.

Figure 11:
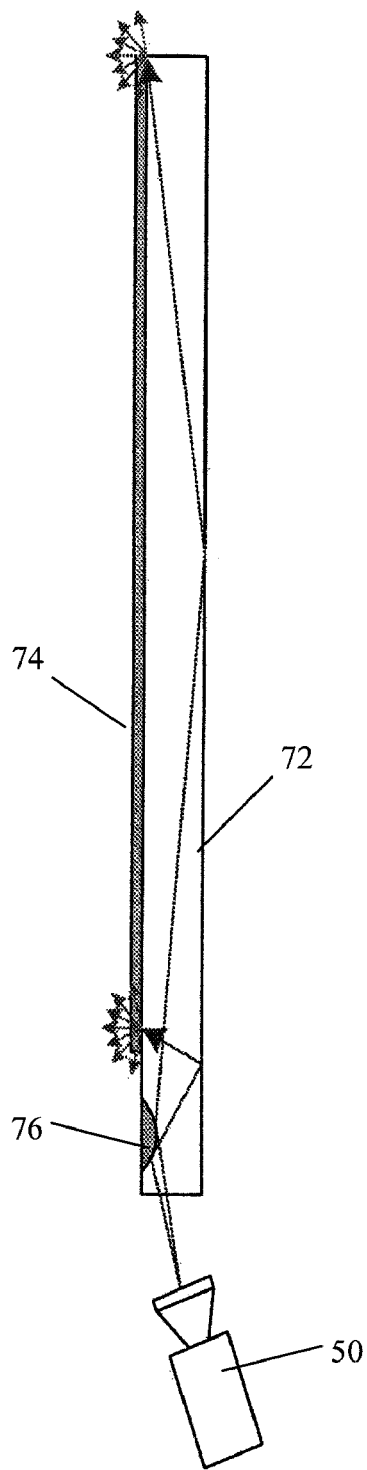
FIGS. 11 and 12 are example diagrams of display having a waveguide substrate and a curved reflector, in accordance with embodiments.

Example FIG. 11 illustrates a display with a waveguide that is planer, in accordance with embodiments. Waveguide 72 may have surfaces that are substantially parallel, in accordance with embodiments. Display substrate 74 may abut waveguide 72, allowing for light to be transmitted out of waveguide 72 and into display substrate 74 based on the difference between the refractive index of display substrate 74 and waveguide 72. As illustrated in example FIG. 11, a curved reflector 76 may be included in waveguide 72 to distribute light incident on display substrate 74 and minimize the length of waveguide 72, in accordance with embodiments. Curved reflector 76 may be configured to compensate for image distortion.

Figure 12:
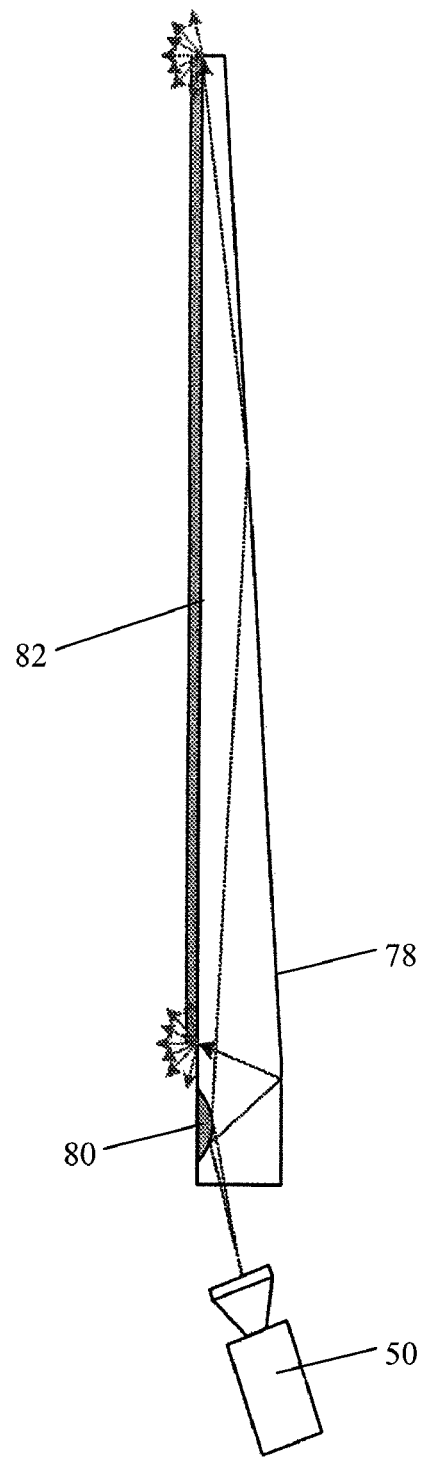

Example FIG. 12 illustrates a wedge shaped waveguide that includes a curved reflector, in accordance with embodiments. Waveguide 78 may have a wedge shape. Curved reflector 80 may be included in waveguide 78.

Figure 13:
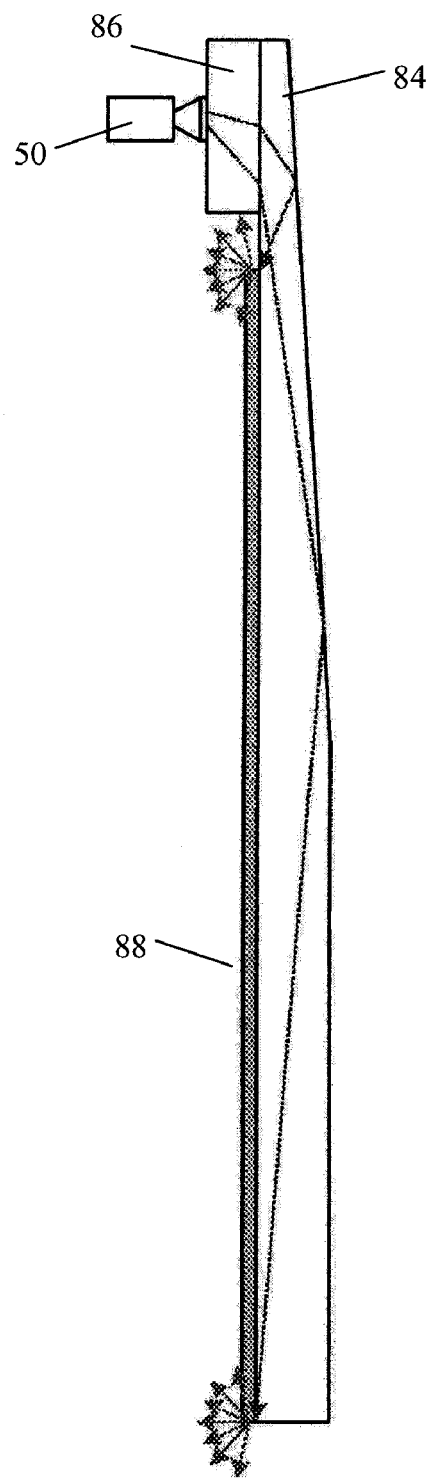
FIG. 13 is an example diagram of a display having two waveguide substrates of different refractive indices, in accordance with embodiments.

Example FIG. 13 illustrates a waveguide that has both a planer portion and a wedge shaped portion, in accordance with embodiments. As illustrated in example FIG. 13, a bottom portion of first waveguide 84 is planer and a top portion of first waveguide 84 has a wedge shape, in accordance with embodiments. A display may include a second waveguide 86, in accordance with embodiments. Second waveguide 86 may abut first waveguide 84, in accordance with embodiments. Second waveguide 86 may have a refractive index different (e.g. greater) than the refractive index of first waveguide 84, in accordance with embodiments. Light source 50 may project light into second waveguide 86. Light projected into second waveguide 86 may be transmitted into first waveguide 84 and bent at the interface of second waveguide 86 and first waveguide 84.

In embodiments, since visible light may be emitted substantially isotropically from light emitting material, in response to absorption of excitation light (e.g. ultraviolet light), the angle that the excitation is projected onto a display substrate may be substantially independent of the direction that visible light is emitted from the display substrate. In other words, even though excitation light (ultraviolet light) may be transmitted into a display substrate at an angle, after the excitation light is absorbed by the light emitting material, the emission light (e.g. visible light) illuminates isotropically in all directions from the display substrate, substantially unaffected and/or independent from the incident angle of the excitation light into the display substrate, in accordance with embodiments.

In embodiments, a planar waveguide (e.g. wedge shaped of rectangular shaped) may be implemented to minimize physical dimensions (e.g. thickness) of a display system. In embodiments, a waveguide may include two parallel mirrors, a optical plate with uniform thickness, an optical plate having a wedge shape, and/or a hybrid of different waveguide types to internally reflect excitation light.

The foregoing embodiments (e.g. light emitting material integration and display mechanism) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising:
   a light source configured to project an excitation light having a wavelength of less than about 500 nanometers;
   a display substrate comprising light emitting particles configured to emit visible light in response to absorption of the excitation light; and
   a waveguide configured to guide the excitation light onto the display substrate,
   wherein the display substrate is substantially homogeneous with the light emitting particles integrated therein, and each of the light emitting particles has a diameter of less than about 500 nanometers.

2. The apparatus of claim 1, wherein:
   the light source is configured to project the excitation light having a wavelength of less than about 450 nanometers.

3. The apparatus of claim 1, wherein each of the plurality of light emitting particles has a diameter less than about 400 nanometers.

4. The apparatus of claim 1, wherein each of the plurality of light emitting particles has a diameter less than about 100 nanometers.

5. The apparatus of claim 1, wherein the light source is one of a micro-mirror array (MMA) projector, a digital light processing (DLP) protector, a liquid crystal display (LCD) projector, and a liquid crystal on silicon (LCOS) projector.

6. The apparatus of claim 1, comprising a light modulator configured to modulate the excitation light.

7. The apparatus of claim 6, wherein the light modulator is a micro-mirror light modulator.

8. The apparatus of claim 1, wherein the light source is a laser or an LED.

9. The apparatus of claim 1, wherein the display substrate is substantially transparent to the excitation light.

10. The apparatus of claim 1, wherein the waveguide comprises at least two reflectors.

11. The apparatus of claim 1, wherein the waveguide comprises a reflector with a curved shape.

12. The apparatus of claim 1, wherein the waveguide comprises at least one waveguide substrate configured to internally reflect the excitation light onto the display substrate.

13. The apparatus of claim 12, wherein the light source is configured to project the excitation light in a plurality of wavelength ranges, and excitation light falling within each range of the plurality of wavelength ranges excites a different set of light emitting particles within the display substrate to emit a specific color of the visible light.

14. The apparatus of claim 12, wherein said at least one waveguide substrate comprises a first waveguide substrate and a second waveguide substrate, wherein the first waveguide substrate and the second waveguide substrate have different refractive indexes.

15. The apparatus of claim 1, wherein the light source is an analog projector.

16. The apparatus of claim 14, wherein:
   the light source is configured to project the excitation light into the first waveguide substrate;
   the excitation light is transmitted from the first waveguide substrate to the second waveguide substrate;
   the excitation light is bent at an angle at the interface of the first waveguide substrate and the second waveguide substrate; and
   the excitation light is internally reflected in the second waveguide substrate onto the display substrate.

17. The apparatus of claim 16, wherein the first waveguide substrate has a refractive index greater than the second waveguide substrate.

18. The apparatus of claim 1, wherein the light emitting particles are formed from a fluorescent material.

19. The apparatus of claim 1, wherein the light emitting particles comprise:
   a first material configured to emit a first visible color in response to absorption of a first bandwidth of the excitation light; and
   a second material configured to emit a second visible color in response to absorption of a second bandwidth of the excitation light, wherein the second visible color is different from the first visible color.

20. The apparatus of claim 1, wherein the waveguide comprises both a reflector and a waveguide substrate.

* * * * *